United States Patent [19]

Rosenberg

[11] 4,454,975

[45] Jun. 19, 1984

[54] SHEET-FEED TRACTOR PROVIDING PIN OR FRICTION FEED

[75] Inventor: Neil A. Rosenberg, Hollis, N.H.

[73] Assignee: Integral Data Systems, Inc., Milford, N.H.

[21] Appl. No.: 396,001

[22] Filed: Jul. 7, 1982

[51] Int. Cl.$^3$ .................... G03B 1/30

[52] U.S. Cl. .................... 226/74; 400/616

[58] Field of Search .................... 226/1, 6, 25, 74, 75, 226/52, 170–172; 400/616, 616.1, 616.2; 271/34, 35

[56] References Cited

U.S. PATENT DOCUMENTS

| | | | |
|---|---|---|---|
| 3,209,973 | 10/1965 | Eichorn | 226/74 |
| 3,219,245 | 11/1965 | Manor et al. | 226/74 |
| 3,421,612 | 1/1969 | Pitt | 197/133 |
| 3,917,048 | 11/1975 | Riley | 197/133 P |
| 3,958,735 | 5/1973 | Wanat | 226/1 |
| 4,058,196 | 11/1977 | Rempel | 197/133 R |
| 4,087,172 | 5/1978 | Van Dongen | 355/14 |
| 4,359,179 | 11/1982 | Waiss | 226/25 |

*Primary Examiner*—Leonard D. Christian

*Attorney, Agent, or Firm*—Cesari and McKenna

[57] ABSTRACT

A sheet-feed tractor of the type that includes a belt with pins for advancing edge-perforated paper is provided with an extension on its web-retention door for mounting an idler roller that is used for friction feed of paper that does not have edge perforations. A drive roller is provided opposite the idler roller on a drive shaft that also is used to drive the belt containing the pins. As a consequence, paper located between the drive and idler rollers is advanced when the drive shaft is rotated.

17 Claims, 5 Drawing Figures

SHEET-FEED TRACTOR PROVIDING PIN OR FRICTION FEED

BACKGROUND OF THE INVENTION

The present invention relates generally to web advancement, and it is directed particularly to sheet-feed tractors of the type used on printers and similar apparatus.

Previous advances in the tractor art have focused on the simplification of the tractor itself and on the improvement of the performance of its traditional functions. In contrast, the present invention advances the art by enhancing printer capability while at the same time permitting printer simplification.

Conventional web-feed tractors are typically employed in pairs as part of an attachment for a printer to adapt it to advancement of continuous-feed paper having edge perforations. The printer itself usually includes a drive mechanism for advancing single-sheet paper frictionally. In some printers, the friction-feed mechanism includes a pair of rollers that are spaced below a flat platen that backs the paper where the print head strikes it. In other printers, it includes a cylindrical platen, which is rotated by a drive mechanism in the printer. An idler roller grips the paper between it and the platen, and the rotation of the platen thereby advances the paper.

Particularly when a pair of rollers separate from the platen is used, the printer cannot print all the way to the bottom of the page. Even printers in which the platen itself is used for paper advancement leave a gap at the bottom of the page in which they cannot print. And both types of printers are unable to advance the sheet out of the print area when printing on the sheet has been completed.

This problem is solved by the use of the tractor attachment. The tractor attachment provides mechanical engagement of the drive mechanism whereby the tractors, which engage the edge perforations of the web, are driven by the printer drive mechanism, and they thereby advance the web. The tractors are adjustably mounted on a support shaft spaced above the platen so that they can accommodate webs of different widths. Since the tractors are spaced above the platen and pull the web from above, they can continue to advance the paper to the bottom edge of a single sheet and beyond. The tractors can thereby advance a completed page out of the print area so that the next page can be printed. In the past, however, tractors have been limited to use with continuous edge-perforated paper.

An object of the present invention is to enable the printer to print all the way to the bottom of the page when it is advancing single-sheet paper and to remove the single sheet from the print area when printing on it has been completed. A further object is to eliminate the need for friction-feed rollers in the printer itself by means of a simple addition to a conventional tractor.

SUMMARY OF THE INVENTION

The foregoing and related objects are achieved in a sheet-feed tractor that performs both pin feed and friction feed of a web. The tractor includes a frame, a drive shaft journaled in the frame for rotation about its axis, and a pin-feed assembly also mounted in the frame. The pin-feed assembly includes a multiplicity of pins that engage perforations in an edge-perforated web, and the drive shaft drives the pins to advance the web when the drive shaft rotates.

A drive roller is mounted on the drive shaft to rotate with it, and it provides a peripheral friction surface that is spaced axially inboard from the pins for engagement of the narrower single-sheet paper. A web-retention door is mounted on the frame for pivoting between closed and open positions and an idler roller providing a peripheral friction surface is rotatably mounted in the door. In its open position, the door is spaced from the pins and the drive roller to permit insertion and removal of web material. In its closed position, the door positions the idler roller opposite the drive roller to provide a nip through which the driver roller feeds the web. The peripheral surfaces of the rollers are shaped to continuously engage the web disposed between them and thereby continuously feed the web when the drive shaft rotates continuously.

If the wider edge-perforated web is used, closing of the door retains the web in engagement with the tractor pins. As a result, the tractor is operable for both pin feed of edge-perforated paper and friction feed of non-perforated paper.

Brief Description of the Drawings

These and further features and advantages of the present invention are described more specifically in connection with the accompanying drawings, in which.

DESCRIPTION OF THE PREFERRED EMBODIMENTS

Figure 1:
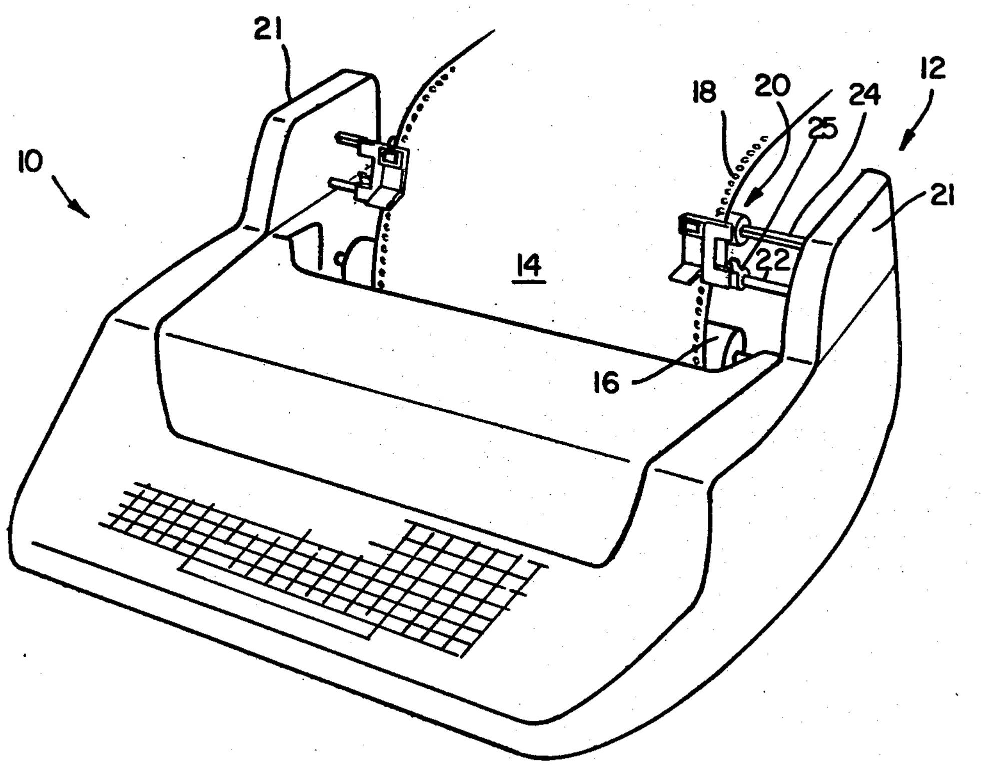
FIG. 1 is a view that illustrates a conventional printer with an attachment that includes tractors of the present invention.

FIG. 1 shows a printer 10 that includes a continuous-feed attachment 12. The attachment is similar in some respects to conventional attachments for pin feeding edge-perforated paper. In the conventional printer, a print head (not shown) strikes a paper sheet 14 which is depicted in FIG. 1 as a part of a continuous web but can be provided in individual page-sized sheets, as will become clear below. Sheet 14 is backed by a rotatable platen 16. When attachment 12 is not used, a roller, not shown in the drawings, grips the paper between it and platen 16 to advance the paper when a drive mechanism in the printer rotates the platen.

When attachment 12 is to feed continuous paper, the roller is usually moved away from platen 16 so that sheet 14 can advance independently of the rotation of platen 16. Attachment 12 is placed into position for engagement by the printer drive mechanism, and sheet 14 is positioned for engagement of edge perforations 18 by pins on drive belts, not shown in FIG. 1, contained in tractors 20.

Attachment 12 includes side plates 21 that serve as a base for a support shaft 22. Each tractor includes a clamp 25 that clamps the tractor in place on support shaft 22. The clamp can be loosened to permit positioning of tractors 20 in the desired axial positions along support shaft 22 and then retightened to secure the tractors in their new positions.

With attachment 12 in position on printer 10, the printer drive mechanism engages gearing internal to the attachment to rotate a drive shaft 24. Drive shaft 24, in turn, drives the pin-feed mechanisms of tractors 20 to advance pins that engage in the edge perforations 18 of the sheet 14. A web-retention door 26 on each tractor 20 holds the sheet 14 in engagement with the pins.

This much of the operation of the tractors is conventional. According to the present invention, however, the tractors 20 can also advance sheets frictionally. As a result, the tractors can advance paper that does not have edge perforations.

Figure 2:
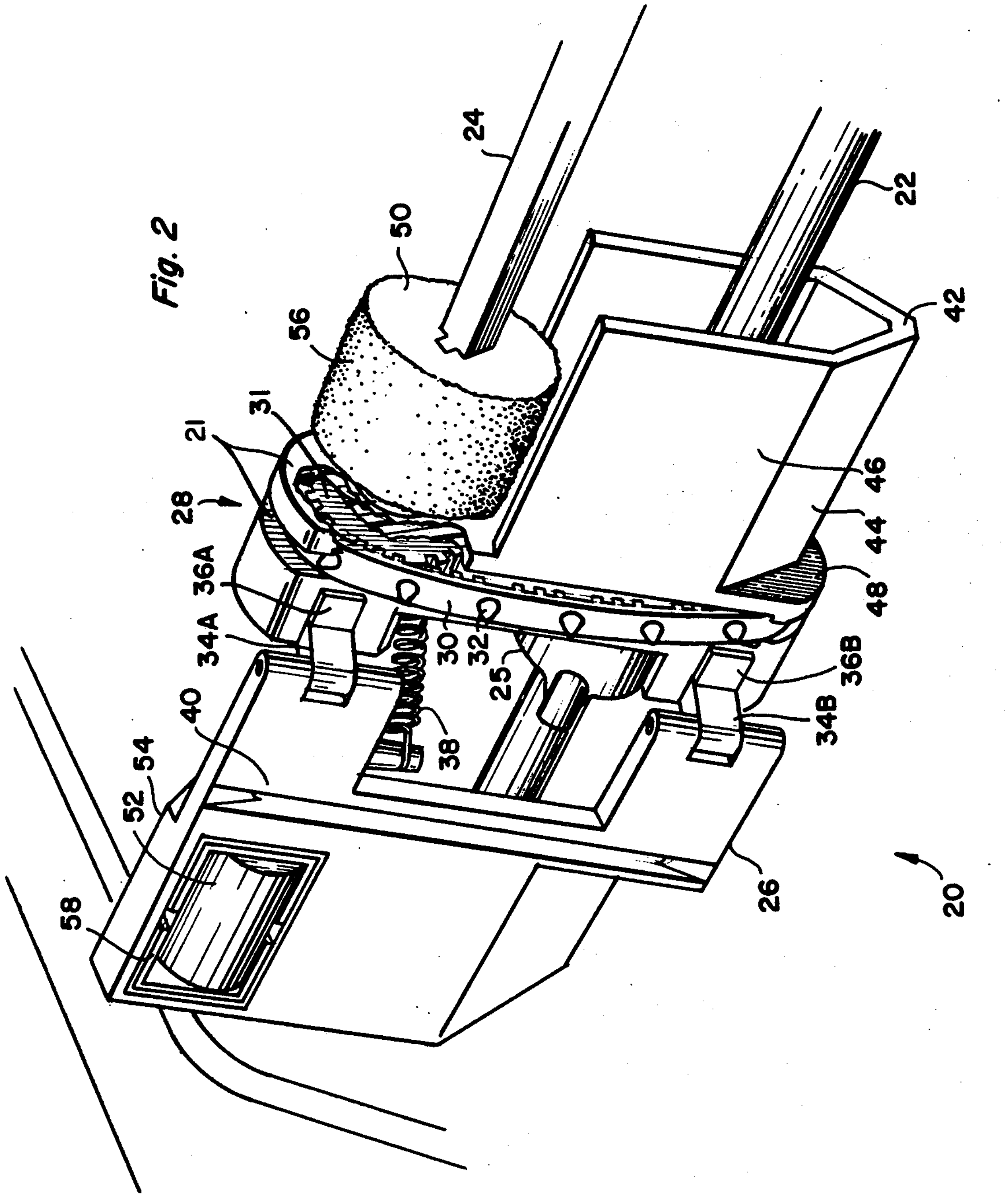
FIG. 2 is a perspective view of a tractor of the present invention in its open position.

FIG. 2 shows a tractor 20 in more detail. A body portion 28 provides an endless path, and the pin-feed mechanism includes a drive belt 30 that is trained around that path. Drive belt 30 provides the pins 32, which protrude from its outer surface and are spaced apart so as to fit into successive perforations in the web. The pin-feed mechanism also includes a sprocket 31 that is carried by body portion 28 of tractor 20 and is driven by drive shaft 24. The sprocket in turn drives belt 30.

A pair of mounting tabs 34A and 34B on the upper surface of body portion 28 pivotably mount door 26 on tractor 20. Door 26 is pivotable from the open position shown in FIG. 2 to the closed position shown in FIG. 1. In the closed position, raised lands 36A and 36B on the upper surface of body portion 28 hold web-retention door 26 at such a spacing from the rest of the upper surface of body portion 28 that door 26 maintains the web in engagement with pins 32 but does not impede its advancement.

A coil spring 38 is stretched between body portion 28 and door 26 in an over-center arrangement by which it biases door 26 open when the door is in its open position and biases it closed when it is in its closed position.

When tractor 20 is to drive edge-perforated paper, the edge perforations are placed on the pins 32, and door 26 is closed so that it holds the paper in engagement with the pins. The door 26 has an elongated slot 40 to accommodate pins 32 in the web-engagement portion of the endless path of belt 30. The gearing internal to attachment 12 then rotates drive shaft 24 in accordance with movement of the printer drive mechanism and drive shaft 24 thus rotates sprocket 31 to advance drive belt 30 and thereby advance the sheet 14.

An extension 42 of body portion 28 extends laterally from body portion 28 to provide inner guide surfaces 44 and 46 for an unperforated web.

The tractor includes a drive roller 50 mounted for rotation by drive shaft 24, and an idler roller 52 on an extension 54 of the door 26. Drive roller 50 includes an outer friction surface 56.

Idler roller 52 is preferably mounted for rotation in a support frame 58 that is in turn pivotably mounted in door extension 54. Idler roller 52 thus adjusts the orientation of its axis when the door is closed so that its peripheral surface most effectively engages paper disposed between it and drive roller 50.

Figure 3:
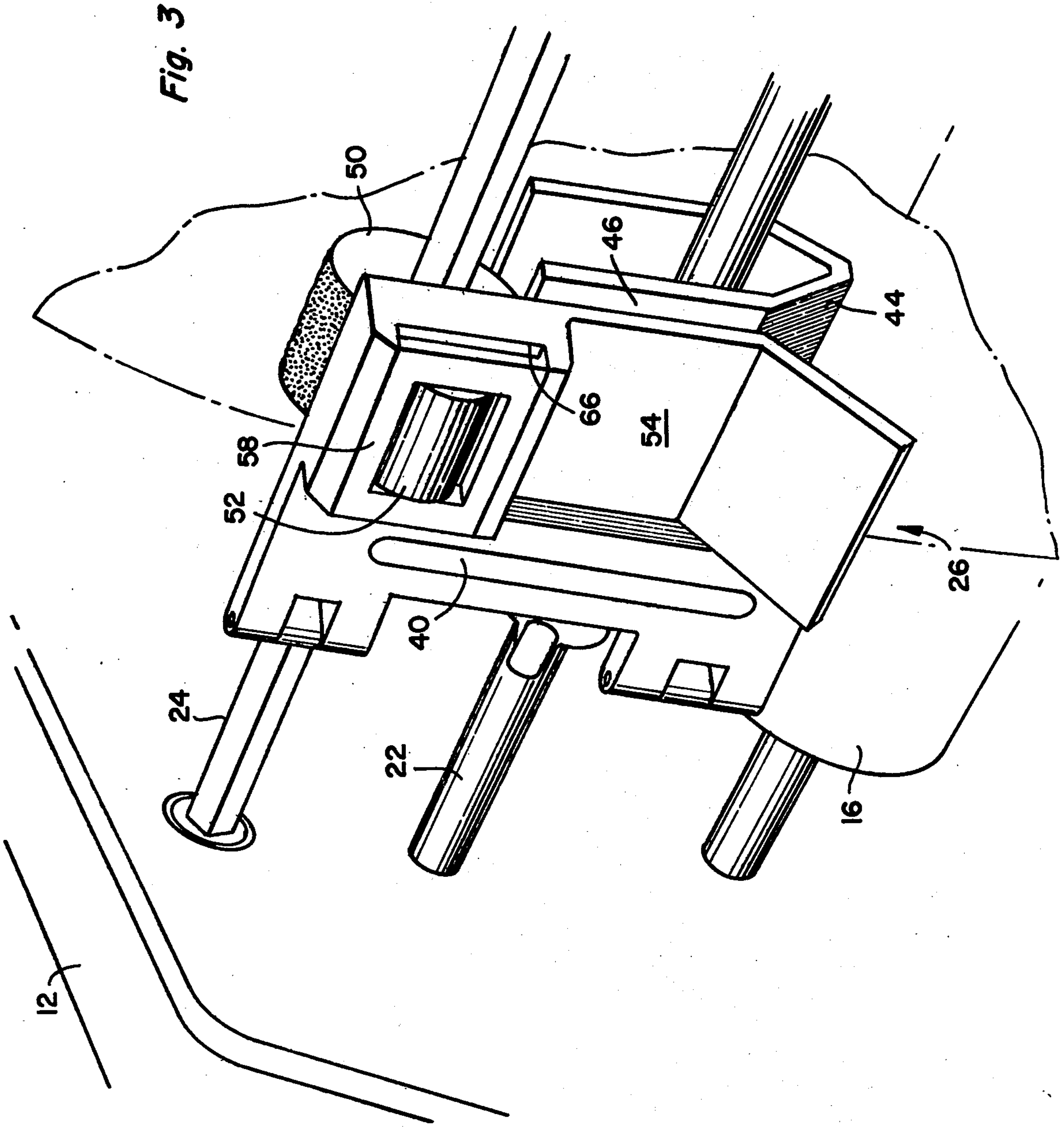
FIG. 3 is a similar view of the tractor in its closed position.
Figure 4:
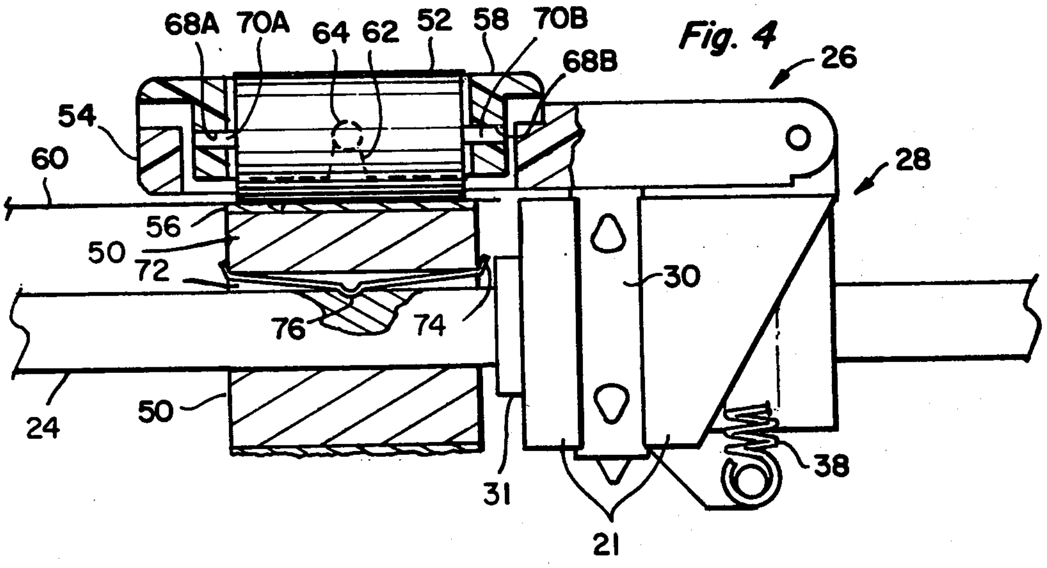
FIG. 4 is an end elevation of the tractor in the closed position with parts broken away.

FIGS. 3 and 4 show tractor 20 with door 26 in its closed position and drive roller 50 positioned to advance paper having no edge perforations. In FIG. 4, the mounting of idler roller 52 is shown in more detail. The mounting frame 58 includes slots 62 extending upward on opposite ends and receiving pins 64 extending from opposite surfaces of the recess 66 (FIG. 3) of door extension 54. Frame 58 has holes 68A and 68B at opposite ends of roller 52. Holes 68A and 68B receive pins 70A and 70B, respectively, to rotatably mount idler roller 52. Roller 52 is thus free to pivot and thereby accommodate dimensional tolerances that might otherwise cause the peripheral surfaces of rollers 50 and 52 to form an angle and thus reduce their effectiveness in advancing a single-page sheet 60 disposed between them.

Also shown in more detail in FIG. 4 is drive roller 50, which is shown in section to reveal its central axial aperture 72, which receives drive shaft 24. Aperture 72 contains a spring 74 that has a protrusion 76 received in a small recess in drive shaft 24. The protrusion snaps into the recess to locate drive roller 50 in a predetermined axial position on shaft 24. Drive roller 50 can easily be moved from this position by manually sliding roller 50.

The edge of sheet 60 in FIG. 4 lies between drive roller 50 and the body portion 28 of tractor 20. Tractor 20 is typically adjusted in position along drive shaft 24 to achieve this relative positioning between it and sheet 60 when it is to feed the sheet frictionally.

In order to use tractors 20 to feed single sheets of paper frictionally, the operator feeds the paper sheet into the printer in the manner normally used for friction feeding of single sheets. He also positions the tractors along support shaft 22 in such relative positions that they can simultaneously receive opposite edges of the sheet in the position depicted in FIG. 4.

The sheet 60 will ordinarily not reach the tractors when it is first placed in the printer. It is thus only fed by the normal operation of the printer at first. As printing proceeds, the feeding of the sheet causes it to advance into the space, best seen in FIG. 3, between door extension 54 and surface 44 of body extension 42. This surface and the lower surface of door extension 54 guide the sheet onto guide surface 46 and ultimately into engagement with rollers 52 and 56. The sheet is then advanced simultaneously by the printer and the tractor. The sheet eventually reaches a point at which it no longer is effectively advanced by the printer, but the tractor continues to advance it. This is advantageous, particularly in the case of a printer having a set of drive rollers separate from and positioned below the platen, because it permits printing all the way down to the bottom of the page. Furthermore, the tractors can advance the sheet all the way out of the print area; conventional drive systems cannot.

Figure 5:
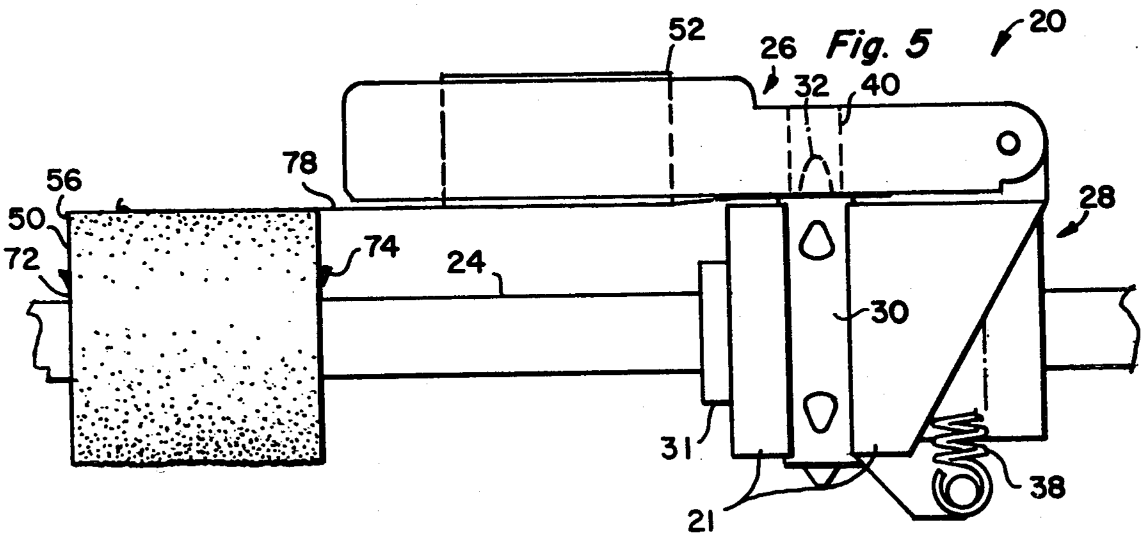
FIG. 5 is a view similar to that of FIG. 4 but with the drive roller in the position in which it is offset from the idler roller.

In order to switch from friction feed to pin feed, the operator typically does not need to readjust the tractor positions. He merely slides drive roller 50 from the position depicted in FIG. 4 to the one shown in FIG. 5, in which the drive roller is no longer positioned opposite idler roller 52. Consequently, it is possible for the sheet, an edge-perforated roll 78 of paper in this case, to move independently of drive roller 50. In actuality, since its edge perforations are engaged by pins 32, its rate of advancement is substantially the same as the circumferential velocity of drive roller 50. However, relative motion between sheet 78 and drive roller 50 should ordinarily be permitted in the pin-feed mode in order to accommodate any small differences in speed between roller 50 and belt 30.

When edge-perforated paper 78 is to be fed by tractor 20, it is placed on tractors 20 while the tractors are in the position illustrated in FIG. 2, and the holes in the paper are placed over pins 32. Door 26 is then closed over paper 78 so that the pins 32 in the web-engagement portion of the path of belt 30 are received in slot 40 of door 26 and thus prevent the sheet 78 from coming out of engagement with pins 32 of belt 30. The printer then drives the drive shaft in the usual manner and the paper is advanced.

It can be appreciated in light of the foregoing description that the invention disclosed in the drawings constitutes a significant advance in the art. Employed with a conventional printer, it permits printing all the way to the bottom of the page and can then advance the sheet out of the printing area. This additional capability is provided by only a small addition to a conventional attachment normally employed.

Additionally, tractors of the present invention can be used to eliminate the printer drive rollers altogether. If the attachment 12 of FIG. 1 is modified to locate tractors 20 closer to the platen, they can be used as the exclusive means for driving single sheets. The printer can thus be simplified with only a small amount of addition to the conventional tractor. The resulting apparatus employs the same drive shaft for both pin feed and friction feed.

What is claimed as new and desired to be secured by Letters Patent is:

1. A sheet-feed tractor for both pin feed and friction feed of a web to be advanced, the tractor comprising:
- A. a frame;
- B. a drive shaft journaled in said frame for rotation about its axis and adapted to be rotated by a drive means;
- C. a pin-feed assembly
  - (i) including a multiplicity of pins that engage in perforations of an edge-perforated web,
  - (ii) mounted in said frame for travel of said pins along an endless path, and
  - (iii) driven by said drive shaft to advance said web upon rotation of said drive shaft;
- D. a drive roller mounted on said drive shaft for driving thereby to rotate therewith and providing a peripheral friction surface spaced axially of said drive shaft from said pins;
- E. a web-retention door mounted on said frame for pivoting between a closed position, in which said door retains said web in engagement with said pins, and an open position, in which said door is spaced from said pins and said peripheral surface of said drive roller to permit insertion and removal of said web;
- F. an idler roller providing a peripheral surface, rotatably mounted in said web-retention door, and located so that, when said door is in its closed position, said idler roller is disposed opposite said drive roller to provide a nip through which said drive roller feeds said web, said rollers being shaped to continuously engage the web disposed between them and thereby continuously feed the web upon continuous rotation of said drive shaft, said tractor thereby being operable for both pin feed of edge-perforated paper and friction feed of other paper.

2. A sheet-feed tractor as recited in claim 1 further including bias means for biasing said web-retention door closed at least while it is in its closed position.

3. An apparatus as recited in claim 1 wherein said drive roller is slidable axially of said drive shaft from a drive axial position, in which said peripheral friction surface thereof is disposed opposite said peripheral surface of said idler roller, to other axial positions, in which said peripheral surfaces are spaced apart axially of said drive shaft to permit a web disposed between said rollers to move independently of the motion of said rollers.

4. An apparatus as recited in claim 3 further comprising:
- A. a second pin-feed assembly
  - (i) including a multiplicity of second pins that engage in perforations of an edge-perforated web,
  - (ii) mounted in said frame for travel of said second pins along an endless path, said rollers being shaped to continuously engage the web disposed between them and thereby continuously feed the web upon continuous rotation of said drive shaft, said tractor thereby being operable for both pin feed of edge-perforated paper and friction feed of other paper.

5. An apparatus as recited in claim 3 or 4 further including bias means for biasing said web-retention door closed at least while it is in its closed position.

6. An apparatus as recited in claim 1 wherein said frame includes a tractor body, a base in which said drive shaft is journaled, and means mounting said tractor body on said base, said tractor body supporting said pin-feed assembly and said web-retention door, said pin-feed assembly including a drive sprocket rotatably mounted in said tractor body, said pin-feed assembly further including an endless belt providing said drive pins thereon, said endless belt being trained about said tractor body in said endless path and being drivingly engaged by said drive sprocket for travel of said belt in said endless path upon rotation of said drive sprocket, said drive sprocket being mounted on said drive shaft for rotation thereby upon rotation of said drive shaft about its axis.

7. An apparatus as recited in claim 6 wherein said drive roller is slidable axially of said drive shaft from a drive axial position, in which said peripheral friction surface thereof is disposed opposite said peripheral surface of said idler roller when said door is in its closed position, to other axial positions, in which said peripheral surfaces are spaced apart axially of said drive shaft to permit a web disposed between said rollers to move independently of the motion of said rollers.

8. An apparatus as recited in claim 7 further comprising:
- A. a second pin-feed assembly
  - (i) including a multiplicity of second pins that engage in perforations of an edge-perforated web,
  - (ii) mounted in said frame for travel of said second pins along a second endless path,
  - (iii) spaced axially of said drive shaft from said first-mentioned pin-feed assembly, and
  - (iv) driven by said drive shaft to advance said web upon rotation of said drive shaft;
- B. a second drive roller mounted on said drive shaft for rotation therewith and providing a peripheral friction surface spaced axially of said drive shaft from said second pins, said second drive roller being slidable from a drive axial position thereof to other axial positions spaced from said drive axial position thereof
- C. a second web-retention door pivotably mounted on said frame for pivoting between a closed position, in which said second door retains said web in engagement with said second pins, and an open position, in which said door is spaced from said second pins to permit insertion and removal of said web; and D. a second idler roller providing a peripheral surface, rotatably mounted in said second web-retention door, and located so that, when said second door is in its closed position, said second idler roller is disposed opposite said drive roller when said second drive roller is in its drive axial position to provide a nip through which said drive roller feeds said web, said rollers being shaped to continuously engage the web disposed between them and thereby continuously feed the web upon continuous rotation of said drive shaft, said second idler roller being axially spaced from said second drive roller when it is in some of its other axial positions to permit said web to move independently of said second rollers;

wherein said frame includes first and second tractor bodies, a base in which said drive shaft is journaled, and means mounting said tractor bodies on said base at positions spaced from each other axially of said drive shaft, said first and second tractor bodies supporting said first and second pin-feed assemblies and said first and second web-retention doors, respectively, said first and second pin-feed assemblies including first and second drive sprockets, respectively, rotatably mounted in said first and second tractor bodies, respectively, said first and second pin-feed assemblies further including first and second endless belts, respectively, providing said first and second drive pins, respectively, thereon, said first and second belts being trained about said first and second tractor bodies, respectively, in the first and second endless paths, respectively, said first and second belts being drivingly engaged by said first and second drive sprockets, respectively, for travel of said belts in said paths upon rotation of said drive sprockets, each of said drive sprockets being mounted on said shaft for rotation thereby upon rotation of said drive shaft about its axis.

9. An apparatus as recited in claim 6, 7, or 8 further including bias means for biasing said web-retention door closed at least while it is in its closed position.

10. A sheet-feed tractor for both pin feed and friction feed of a web to be advanced, the tractor comprising:

A. a frame;

B. a drive shaft journaled in said frame for rotation about its axis and adapted to be rotated by a drive means;

C. a pin-feed assembly
  (i) including a multiplicity of pins that engage in perforations of an edge-perforated web,
  (ii) mounted in said frame for travel of said pins along an endless path, and
  (iii) driven by said drive shaft to advance said web upon rotation of said drive shaft;

D. a drive roller mounted on said drive shaft for driving thereby to rotate therewith and providing a peripheral friction surface, said drive roller being disposed in a drive axial position, in which said peripheral friction surface is spaced axially of said drive shaft from said pins, but being readily manually slidable axially of said drive shaft from the drive axial position to other axial positions;

E. a web-retention door mounted on said frame for pivoting between a closed position, in which said door retains said web in engagement with said pins, and an open position, in which said door is spaced from said pins and said peripheral surface of said drive roller to permit insertion and removal of said web;

F. an idler roller providing a peripheral surface, rotatably mounted on said web-retention door, and located so that, when said door is in its closed position and said drive roller is in its drive axial position, said idler roller is disposed opposite said drive roller to provide a nip through which said drive roller feeds said web, said rollers being shaped to continuously engage the web disposed between them when said drive roller is in its drive axial position and thereby continuously feed the web upon continuous rotation of said drive shaft, said idler roller being axially spaced from said drive roller when said drive roller is in some other axial positions thereof to permit the web to move independently of the motion of said rollers, said tractor thereby being operable for both pin feed of edge-perforated paper and friction feed of other paper.

11. An apparatus as recited in claim 10 further including bias means for biasing said web-retention door closed at least while it is in its closed position.

12. An apparatus as recited in claim 10 further comprising:

A. a second pin-feed assembly
  (i) including a multiplicity of second pins that engage in perforations of an edge-perforated web,
  (ii) mounted in said frame for travel of said second pins along an endless path, said rollers being shaped to continuously engage the web disposed between them and thereby continuously feed the web upon continuous rotation of said drive shaft, said tractor thereby being operable for both pin feed of edge-perforated paper and friction feed of other paper.

13. An apparatus as recited in claim 10 wherein said frame includes a tractor body, a base in which said drive shaft is journaled, and means mounting said tractor body on said base, said tractor body supporting said pin-feed assembly and said web-retention door, said pin-feed assembly including a drive sprocket rotatably mounted in said tractor body, said pin-feed assembly further including an endless belt providing said drive pins thereon, said endless belt being trained about said tractor body in said endless path and being drivingly engaged by said drive sprocket for travel of said belt in said endless path upon rotation of said drive sprocket, said drive sprocket being mounted on said drive shaft for rotation thereby upon rotation of said drive shaft about its axis.

14. An apparatus as recited in claim 13 further comprising:

A. a second pin-feed assembly
  (i) including a multiplicity of second pins that engage in perforations of an edge-perforated web,
  (ii) mounted in said frame for travel of said second pins along a second endless path,
  (iii) spaced axially of said drive shaft from said first-mentioned pin-feed assembly, and
  (iv) driven by said drive shaft to advance said web upon rotation of said drive shaft;

B. a second drive roller mounted on said drive shaft for rotation therewith and providing a peripheral friction surface spaced axially of said drive shaft from said second pins, said second drive roller being slidable from a drive axial position thereof to other axial positions spaced from said drive axial position thereof C. a second web-retention door pivotably mounted on said frame for pivoting between a closed position, in which said second door retains said web in engagement with said second pins, and an open position, in which said door is spaced from said second pins to permit insertion and removal of said web; and D. a second idler roller providing a peripheral surface, rotatably mounted in said second web-retention door, and located so that, when said second door is in its closed position, said second idler roller is disposed opposite said drive roller when said second drive roller is in its drive axial position to provide a nip through which said drive roller feeds said web, said rollers being shaped to continuously engage the web disposed between them and thereby continuously feed the web upon continuous rotation of said drive shaft, said second idler roller being axially spaced from said second drive roller when it is in some of its other axial positions to permit said web to move independently of said second rollers;

wherein said frame includes first and second tractor bodies, a base in which said drive shaft is journaled, and means mounting said tractor bodies on said base at positions spaced from each other axially of said drive shaft, said first and second tractor bodies supporting said first and second pin-feed assemblies and said first and second web-retention doors, respectively, said first and second pin-feed assemblies including first and second drive sprockets, respectively, rotatably mounted in said first and second tractor bodies, respectively, said first and second pin-feed assemblies further including first and second endless belts, respectively, providing said first and second drive pins, respectively, thereon, said first and second belts being trained about said first and second tractor bodies, respectively, in the first and second endless paths, respectively, said first and second belts being drivingly engaged by said first and second drive sprockets, respectively, for travel of said belts in said paths upon rotation of said drive sprockets, each of said drive sprockets being mounted on said shaft for rotation thereby upon rotation of said drive shaft about its axis.

15. An apparatus as recited in claim 13 or 14 further including bias means for biasing said web-retention door closed at least while it is in its closed position.

16. A sheet-feed tractor as recited in claim 1 or 10 wherein said web-retention door includes a mounting frame therein rotatably mounting said idler roller on said door, said mounting frame being moveable with respect to the rest of said door to permit tilting of the axis of said idler roller with respect to the axis of said drive roller for alignment of the axes of said drive and idler rollers while said door is in its closed position.

17. A sheet-feed tractor as recited in claim 16 wherein said mounting frame is pivotably mounted on the rest of said door for pivoting thereof about a pivot axis substanially parallel to the axis about which said door pivots.

* * * * *